United States Patent
Dugas et al.

(10) Patent No.: US 7,540,933 B2
(45) Date of Patent: Jun. 2, 2009

(54) APPLICATOR FOR AND METHOD OF APPLYING A SHEET MATERIAL TO A SUBSTRATE

(75) Inventors: Michael Bernard Dugas, Wyoming, OH (US); Keith Hobart Gausmann, Westerville, OH (US); Mark John Steinhardt, Cincinnati, OH (US); Timothy Charles Rothwell, Dublin, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 359 days.

(21) Appl. No.: 11/413,765

(22) Filed: Apr. 28, 2006

(65) Prior Publication Data

US 2007/0034328 A1 Feb. 15, 2007

Related U.S. Application Data (63) Continuation-in-part of application No. 10/700,614, filed on Nov. 4, 2003, now Pat. No. 7,204,288.

(51) Int. Cl.
*B32B 38/18* (2006.01)
*B32B 39/00* (2006.01)

(52) U.S. Cl. .............. 156/269; 156/379.8; 156/526; 156/574; 156/576; 156/577; 222/43; 222/80

(58) Field of Classification Search .......... 156/71, 156/184, 191, 459, 577, 582, 583.8, 250, 156/160, 269, 379.8, 360.6, 380.7, 510, 523, 156/526, 576, 579–581, 574; 15/235.3, 235.4, 15/235.7; 425/458; 16/374, 375, 385, 355; 222/43, 80, 83, 89, 90, 245

See application file for complete search history.

(56) References Cited

U.S. PATENT DOCUMENTS

| 1,960,850 | A | | 5/1934 | Lloyd |
| 2,658,639 | A | | 11/1953 | Goldberg |
| 2,662,658 | A | | 12/1953 | Wynne |
| 3,737,360 | A | * | 6/1973 | Horn .................. 156/577 |

(Continued)

FOREIGN PATENT DOCUMENTS

GB 967 405 A 8/1964

(Continued)

OTHER PUBLICATIONS

Table of dates of Pre-Exposure of Prior Model Applicator, Nov. 5, 2003.

*Primary Examiner*—Philip C Tucker
*Assistant Examiner*—Sing P Chan
(74) *Attorney, Agent, or Firm*—Jeffrey V. Bamber (57) ABSTRACT

A method and device for applying sheet material, such as wallpaper, to a substrate. The applicator is bi-positionable, having a first position where the sheet material is spaced apart from the substrate and a second position where the sheet material contacts the substrate. Additionally or alternatively, the applicator may be provided with a control bar. In the first position, the control bar contacts a portion of the sheet material such as its free end. This minimizes the chance of the sheet material prematurely contacting the substrate. In the second position, the sheet material is disengaged from the control bar for application to the substrate. The applicator and sheet material may be provided together in a kit.

4 Claims, 7 Drawing Sheets

U.S. PATENT DOCUMENTS

| | | | | |
|---|---|---|---|---|
| 3,907,628 A | * | 9/1975 | Buske | 156/574 |
| 3,969,181 A | | 7/1976 | Seabold | |
| 4,026,648 A | | 5/1977 | Takahashi | |
| 4,210,485 A | | 7/1980 | Lake | |
| 4,345,966 A | | 8/1982 | Iiyama et al. | |
| 4,545,090 A | | 10/1985 | Redmond | |
| 4,711,682 A | * | 12/1987 | Barbe et al. | 156/71 |
| 4,806,184 A | * | 2/1989 | Shannon | 156/71 |
| D325,152 S | | 4/1992 | Poole et al. | |
| 5,403,432 A | | 4/1995 | Burch et al. | |
| 5,442,832 A | | 8/1995 | Tonsager | |
| 5,467,497 A | | 11/1995 | Greene et al. | |
| 5,478,432 A | | 12/1995 | Vester | |
| 5,544,384 A | | 8/1996 | Forselius et al. | |
| 5,759,270 A | | 6/1998 | Lee | |
| 5,824,363 A | | 10/1998 | Poole et al. | |
| 6,059,002 A | | 5/2000 | Katami | |
| 6,450,231 B1 | | 9/2002 | Ishikawa | |
| 6,808,586 B1 | * | 10/2004 | Steinhardt | 156/269 |
| 7,204,288 B2 | * | 4/2007 | Kinne et al. | 156/574 |

FOREIGN PATENT DOCUMENTS

WO     WO 02/24468 A1     3/2002

* cited by examiner

APPLICATOR FOR AND METHOD OF APPLYING A SHEET MATERIAL TO A SUBSTRATE

CROSS REFERENCE TO RELATED APPLICATIONS

This application is a continuation-in-part of U.S. patent application Ser. No. 10/700,614, filed on Nov. 4, 2003 now U.S. Pat. No. 7,204,288.

FIELD OF INVENTION

This invention relates to applicators for applying a sheet material to a substrate and also to a method of applying a sheet material to a substrate.

BACKGROUND OF THE INVENTION

Sheet materials are commonly used in everyday life. Examples of sheet materials include wallpaper, billboards, posters and advertisements which are typically applied to vertical surfaces. Other examples include linoleum and other flooring, which are typically applied to horizontal surfaces. Sheet materials may be applied to other sheet materials, i.e., a lamina, to make laminate materials. The laminate materials are then put to the end use. The substrate may also be portable, as in the case of an open container or package.

The art teaches various techniques for applying sheet materials to substrates. For example, some attempts in the art use a knife-edge applicator in an attempt to have a clean break of the sheet material from the applicator to the substrate. Examples in the art include U.S. Pat. No. 5,759,270, iss. Jun. 2, 1998 to Lee; U.S. Pat. No. 6,059,002, iss. May 9, 2000 to Katami; U.S. Pat. No. 6,145,770, iss. Nov. 14, 2000 to Manusch et al.; and U.S. Pat. No. 6,450,231 B1, iss. Sep. 17, 2002 to Ishikawa.

Other attempts in the art use a polygonal device to apply wallpaper to a flat surface or a semi-cylindrical curved tube as found in U.S. Pat. No. 4,711,682, iss. Dec. 8, 1987 to Barbe et al. and U.S. Pat. No. 4,806,184, iss. Feb. 21, 1989 to Shannon, respectively. Shannon further teaches a hand-held wallpaper applicator for applying wallpaper. This applicator has a tensioning mechanism for applying resilient pressure to the sheet material as it is scrolled onto the wall. U.S. Pat. No. 1,960,850, iss. May 29, 1934 to Lloyd teaches a wallpapering machine having a hinged handle. However, none of the aforementioned art addresses the problem of properly positioning the sheet material to be applied on the substrate. If the user wishes to ensure the sheet material is level, is accurately disposed in a corner, etc., special care must be taken with the initial positioning of the sheet material. This problem is exacerbated if the sheet material has pre-applied adhesive, as is often done for convenience.

One attempt to overcome the problems associated with positioning of the sheet material is found in U.S. Pat. No. 5,478,432, iss. Dec. 26, 1995 to Vester, which discloses a wallpaper border applicator having a tack-applier assembly. The assembly is placed in position and retractable tacks inserted into the wall. However, Vester still does not approach the problem of initially positioning the sheet material to be applied and the tacks may damage the wall. If the sheet material is mispositioned at the outset, continuing the mispositioning is not helpful.

One attempt to overcome the problems of mispositioning and maintaining level is found in U.S. Pat. No. 6,206,990 B1, iss. Mar. 27, 2001 to Glenn. Glenn provides an apparatus for applying a masking element having two vertical columns and a dispenser carried laterally therebetween. A level is provided on the dispenser. However, the Glenn apparatus is neither portable, nor suitable for use with smaller amounts of sheet material, e.g., posters, advertisements, etc. Further, Glenn does not provide for use with odd-shaped surfaces.

Yet another attempt in the art to provide dispensing of transfer adhesive is U.S. Pat. No. 5,316,613, iss. May 31, 1994 to Samuelson et al. Samuelson provides a dispenser which applies transfer adhesive to a substrate using an application member. However, Samuelson fails to provide a way to place the adhesive in a corner, or dispense adhesive of indeterminate lengths.

U.S. Pat. No. 6,808,586 B1 issued to Steinhardt discloses a convenient sheet material applicator, particularly a sheet material applicator which allows for conveniently properly positioning and repositioning, as necessary, the sheet material relative to the substrate. U.S. Patent Application Publication No. 2005/0092420 A1, published in the name of Kinne, et al., on May 5, 2005, discloses a multi-burnish applicator and method of applying a sheet material to a substrate. The search for improved features for sheet material applicators, and improved methods for applying sheet materials to a substrate, however, has continued.

SUMMARY OF THE INVENTION

This invention comprises a bi-positionable applicator for applying a sheet material to a substrate. The applicator comprises a housing and an operating unit assembly. The housing may comprise a frame and a holder for receiving a quantity of sheet material. The operating unit assembly may at least partially comprise a portion of the frame. The operating unit assembly may comprise one or more of the following: standoffs for spacing the sheet material away from a substrate; a control bar; and a cutting mechanism. The operating unit assembly is movable relative to the remainder of the housing from a first position to a second position. In the first position or initial position, the standoffs space the sheet material away from the substrate. In the second position or application position, the standoffs retract, and the sheet material is placed in contact with the substrate.

In another embodiment, the claimed invention comprises a method for applying a sheet material to a substrate. The method comprises the steps of providing a bi-positionable applicator. The applicator comprises a housing and at least one operating unit assembly. The housing may comprise a frame and a holder for receiving a quantity of sheet material. A quantity of sheet material is inserted into the holder. The applicator is placed against the substrate, whereby the sheet material is spaced apart from the substrate. If desired, standoffs may be used to space the sheet material apart from the substrate. The sheet material may be adjusted to achieve the desired position and orientiation relative to the substrate. The operating unit assembly is moved from the first position to the second position whereby the sheet material then contacts the substrate and/or at least a portion of the operating unit assembly disengages the sheet material. The applicator is moved in a direction to apply the sheet material to the substrate. Optionally, the operating unit assembly may then be moved from the second position to the first position whereby a portion of the sheet material may be spaced apart from the substrate. This portion of the sheet material may then be cut or otherwise severed through lines of weakness, etc., to release the balance of the sheet material from the portion of the sheet material applied to the substrate. Additionally or alternatively, at least a portion of the operating unit assembly may reengage the substrate.

DETAILED DESCRIPTION OF THE INVENTION

Figure 1:
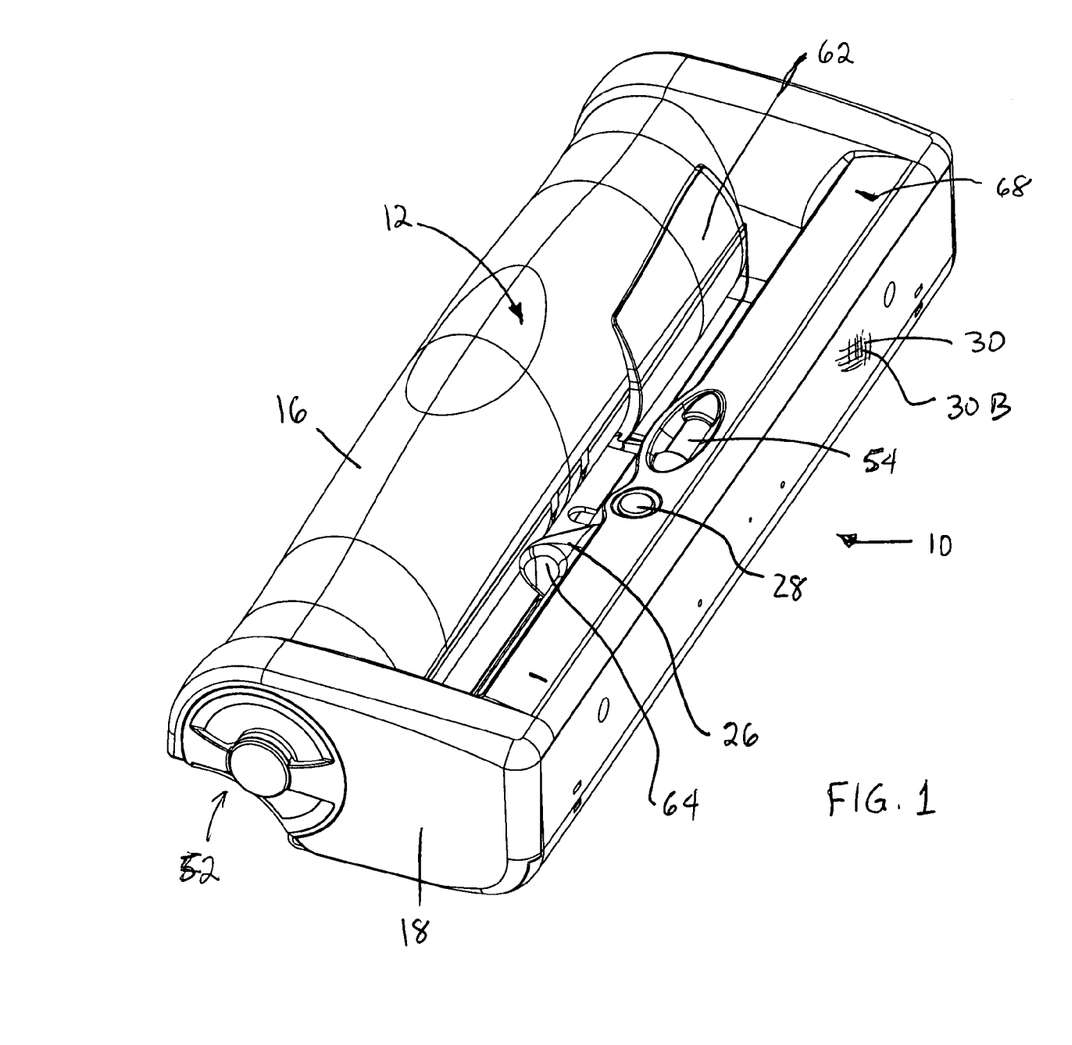
FIG. 1 is a perspective view from the top side of one non-limiting embodiment of an applicator for applying a sheet material to a substrate.

FIG. 1, the invention comprises an applicator 10 for applying a sheet material 20 to a substrate. (The sheet material is enclosed inside the applicator 10 and is first shown in FIGS. 2 and 3). The substrate may be stationary or portable, reusable or disposable, as desired. The substrate may be a product or material adapted for its final use, such as a wall, floor, bowl, open container, or billboard. Alternatively, the substrate may be an intermediate, such as one or more laminae of a laminate. The substrate may be flat and rectilinear, curvilinear, of regular or irregular shape, size and/or texture, as desired.

The sheet material 20 may comprise wallpaper, wrapping paper, film, a protective layer, food covering, paper, non-woven, architectural adhesive films, visually or tactilely perceptible indicia, labels, tape, transfer adhesive, etc. Examples of architectural adhesive films are described in U.S. Patent Application Publication No.: US 2003/0134114 A1, Pallotta, et al., published on Jul. 17, 2003; US 2004/0076788 A1, Steinhardt, et al., published on Apr. 22, 2004; US 2004/0200564 A1, Kinsey, et al., published on Oct. 14, 2004; US 2004/0253421 A1, Truog, et al., published on Dec. 16, 2004; US 2005/0003129 A1, Truog, et al., published on Jan. 6, 2005; and US 2005/0196607 A1, Shih, et al., published on Sep. 8, 2005; and in PCT Publications WO 2004/074003 A2, WO 2004/074009 A2, WO 2005/087490 A1, and WO 2005/087492 A1.

These patent applications disclose an article in the form of an architectural surface covering product that comprises a sheet of dry color component. The sheet of dry color component comprises an opaque layer of dry paint. The article comprises an adhesive on one surface of the sheet of dry color component for application of the architectural surface covering product to a wall, or other type of architectural surface. In certain embodiments, the sheet material 20 may have a releasable liner on the side of the same opposite the adhesive to provide structural support and/or strength to the sheet of dry color component prior to or upon application of the sheet of dry color component to a substrate.

The material 20 may be supplied in the form of a volute spool, such as a spiral wound roll, as is known in the art and as further discussed herein. The sheet material 20 may be wound onto a core, or wound without a core, as desired. A spool of such material 20 may be rotatably mounted in the applicator 10. However, it is to be recognized that a quantity of the sheet material 20 may include one or more discrete or flat sheets of material 20 inserted into the applicator 10.

The material 20 has a width, taken parallel to the longitudinal axis of the spool, and a length, taken parallel to the direction of application of the sheet material 20 onto the substrate. The material 20 further has a thickness, which may be any thickness sufficient to allow for bending of the material 20 during the application process and which provides the desired functionality in use. Preferably the material 20 has thickness of 0.076 mm or less.

The material 20 to be applied has a free end. The free end of the material 20 is the portion of the material 20 which is discrete and is typically the first portion of the material 20 to be applied to the substrate during a given application. The material 20 is removably mounted into the applicator 10. The material 20 may be dispensed until depleted by application to the substrate or, alternatively, may be removed when it is desired to apply a different material 20 to the same or different substrate.

The applicator 10 may be stationary or portable, as desired. Preferably, the applicator 10 is portable, so that it can conveniently apply sheet materials 20 in a desired pattern with minimal set-up. Sheet material 20 may be manually applied from the applicator 10, may be dispensed using a drive motor, and/or may be applied automatically using robotic systems as is known in the art.

The applicator 10 is generally elongate, and has a major axis parallel to the width of the material 20 to be applied and the longitudinal axis of a spool of sheet material inserted into the holder 16. The length of the applicator 10, taken along the major axis, should be great enough to accommodate any desired width of material 20 to be applied. It is to be recognized that the material 20 may be of significantly lesser width than the length of the applicator 10 and that multiple sheets of material 20, each having a width less than the length of the applicator 10, may be simultaneously applied in parallel or sequentially applied in series. If such an arrangement is selected, the materials 20 may be simultaneously applied to a substrate, and the materials 20 may be the same or different, as desired.

Figure 2:
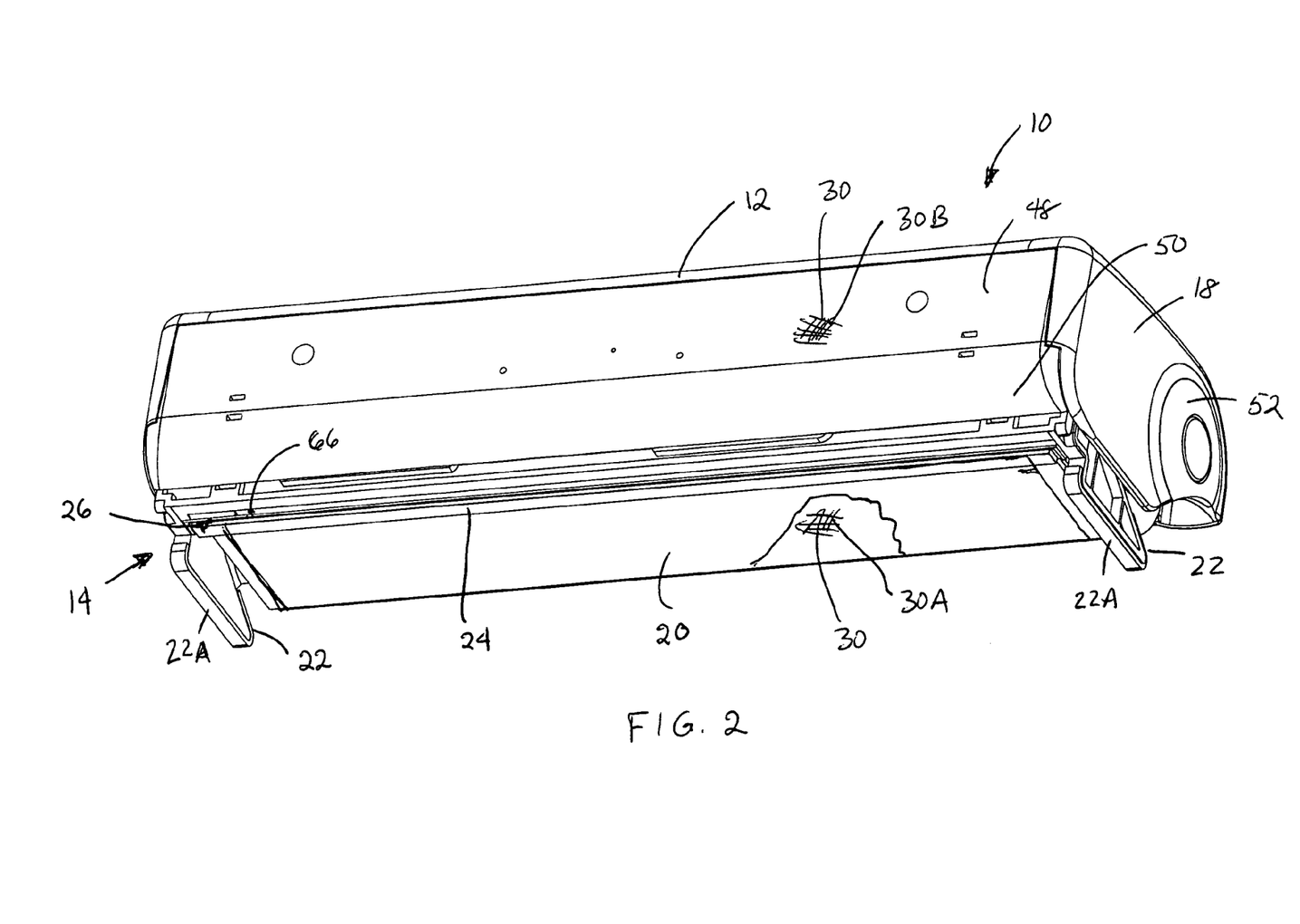
FIG. 2 is a perspective view from the bottom side of the applicator shown in FIG. 1, shown with the applicator in its initial position, and a partially fragmented sheet material.

As shown in FIGS. 1 and 2, the applicator 10 comprises a housing 12 and an operating unit assembly 14. The housing 12 may comprise a holder 16 for holding a quantity of sheet material 20 and a frame 18. The frame 18 may comprise at least a portion of the housing 12 other than the holder 16. The operating unit assembly 14 may at least partially comprise a portion of the frame 18. The operating unit assembly 14 may comprise one or more of the following: standoffs 22 for spacing the sheet material 20 away from a substrate; a control bar 24; and a cutting mechanism 26. The applicator 10 may further comprise a reset button 28, and one or more burnishing surfaces (or "burnishes") 30.

As shown in FIG. 2, the sheet material 20 is fed out from the bottom rear portion of the applicator 10 and extends toward the front of the applicator 10. The sheet material 20 extends across the first burnish 30A, and the free end of the sheet material 20 rests on the control bar 24.

The holder 16 comprises any device suitable for holding the material 20 to be applied to the substrate immediately prior to its application. The holder 16 may be elongate and completely or partially enclose the material 20 to protect it from dirt or other contamination between applications and during storage. However, it is not necessary that the material 20 be covered at all. The holder 16 further may comprise one or more rotatable mountings 32 (shown in FIG. 3) for a spool of the sheet material 20. The rotatable mountings 32 may include trunnions, journals, bearings, a central axle, etc., all of which are known in the art for mounting a spool of sheet material 20 to a holder 16.

Two rotatable mountings 32 may be included, one at each end of the holder 16. If desired, the two rotatable mountings 32 may be coupled together with gears, etc., to improve tracking of the applicator 10 as it applies the material 20. If desired, the rotatable mountings 32 may be loaded or biased to provide braking action, so that the material 20 is not applied too quickly and mistakes are minimized. If the braking action is strong enough, the applicator 10 and material 20 may hang on the wall for a brief period of time, allowing the user to reposition, gather other tools, etc. If desired, the applicator 10 may be provided with a mechanism that allows the braking action to be adjusted.

Figure 3:
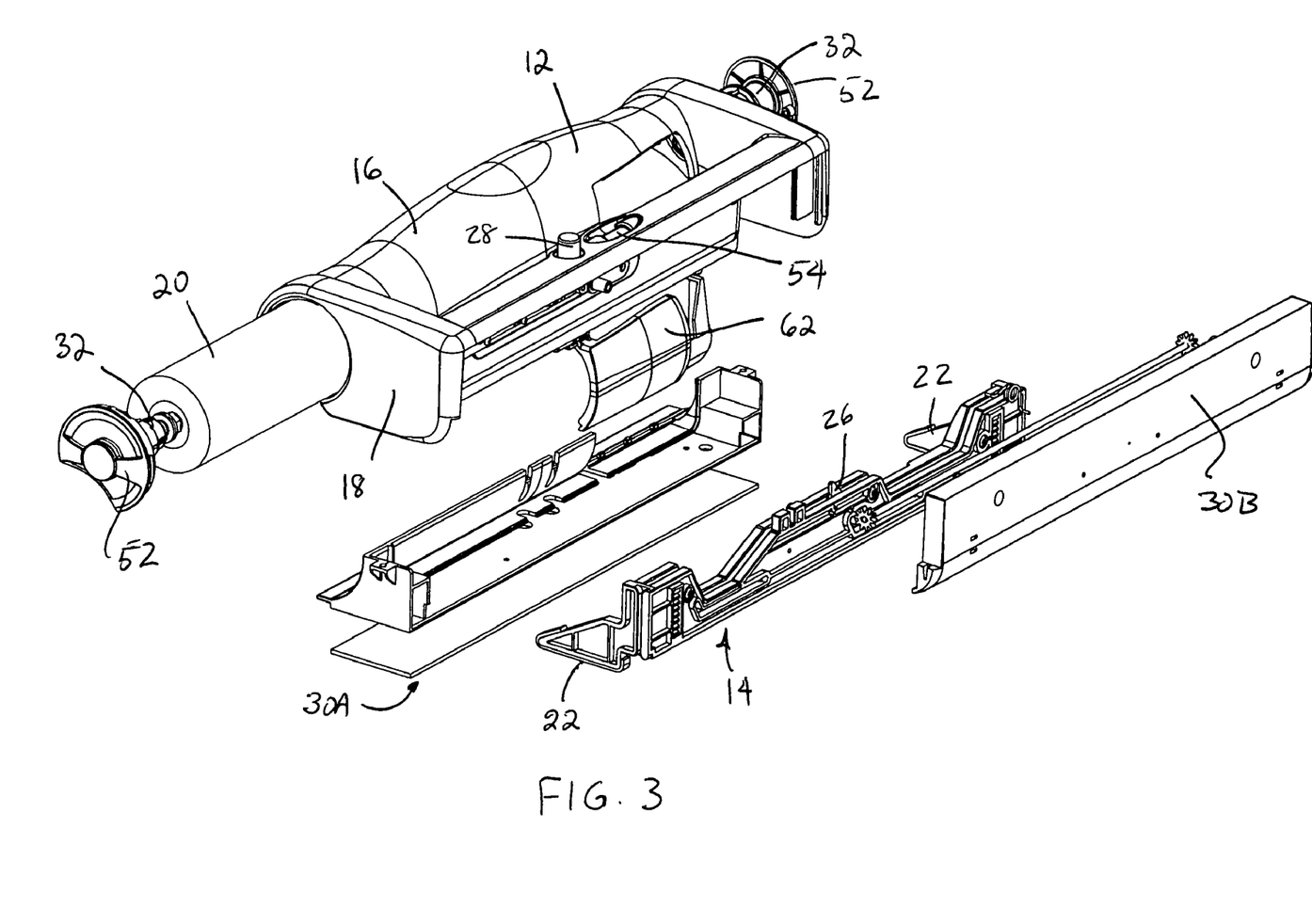
FIG. 3 is an exploded perspective view showing the component parts of the applicator shown in FIG. 1.

FIGS. 2 and 3 show the operating unit assembly 14. As shown in FIGS. 2 and 3, the operating unit assembly 14 comprises a component that is joined to the frame 18 and/or the housing 12. The term "joined", as used in this specification, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. For instance, the operating unit assembly 14 can be considered to be a movable portion of the frame 18.

The operating unit assembly 14 comprises at least one operating unit. The at least one operating unit may comprise one or more of the following: standoffs 22 for spacing the sheet material 20 away from a substrate; the control bar 24; and the cutting mechanism 26. In the embodiment shown in the drawings, the operating unit assembly 14 comprises all three of the foregoing operating units. This provides for simplicity of manufacture and operation. As a result, only one portion of the applicator 10 needs to move to provide three functions.

The operating unit assembly 14 is movable relative to the remainder of the housing 12 from a first position to a second position. In the first position or initial position (shown in FIG. 2), the standoffs 22 space the sheet material 20 away from the substrate. In the second position or application position (shown in FIG. 1), the standoffs 22 retract, and the sheet material 20 is placed in contact with the substrate. Movement of the operating unit assembly 14 relative to the remainder of the housing 12 can be accomplished in any suitable manner, such as by slidable translation. This arrangement may be simply accomplished using grooves and tracks, or other mechanisms. If desired, a rack and pinion gear set may be used to guide the motion of the operating unit assembly 14. The operating unit assembly 14 may be movable manually relative to the remainder of the housing 12 (such as by moving the operating unit assembly either directly, or indirectly (such as by pressing a button), or the movement of the operating unit assembly 14 may be assisted in some suitable manner, such as by a motor, or by biasing the same. Biasing may be done by a spring, gravity influence, cam action, magnetic attraction, etc.

As shown in FIG. 2, the standoffs 22 provide displacement that will space the sheet material away from the substrate immediately prior to application. The standoffs 22 have a leading edge 22A which engages the substrate. The leading edge 22A of the standoffs 22 may be provided with a soft material 20 to prevent marring or damage to the substrate. The standoffs 22 may engage the substrate by direct contact. When the standoffs 22 engage the substrate, the sheet material 20 is spaced apart from the substrate so that premature application of the sheet material 20 is avoided. In the embodiment shown, two standoffs 22 are provided, one at each end of the frame 18. Preferably, the standoffs 22 are disposed outboard, in the width direction, of the sheet material 20. This arrangement avoids direct contact of the standoffs 22 with the sheet material 20 to minimize tearing.

Figure 4:
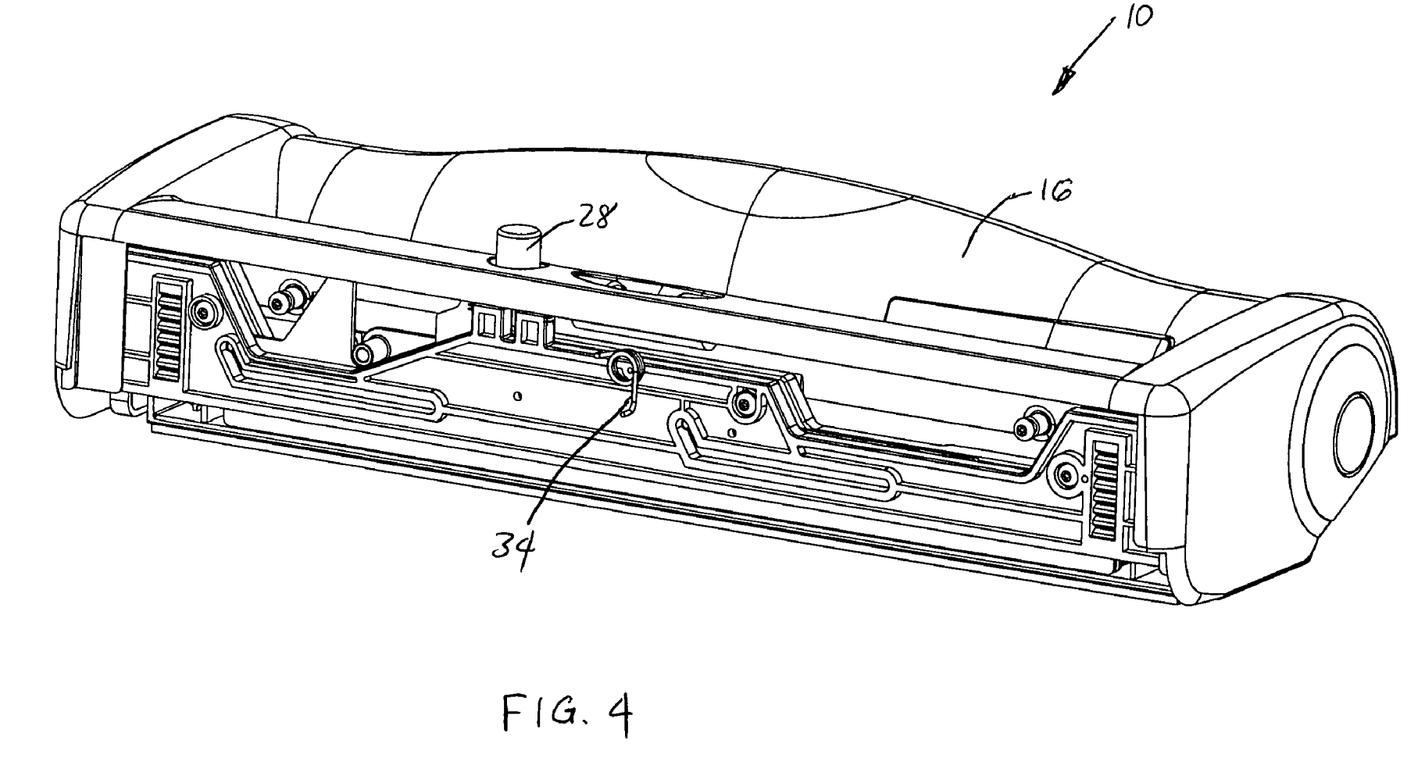
FIG. 4 is a perspective view from the rear of the applicator with a cover plate removed therefrom to show the operating unit assembly.
Figure 5:
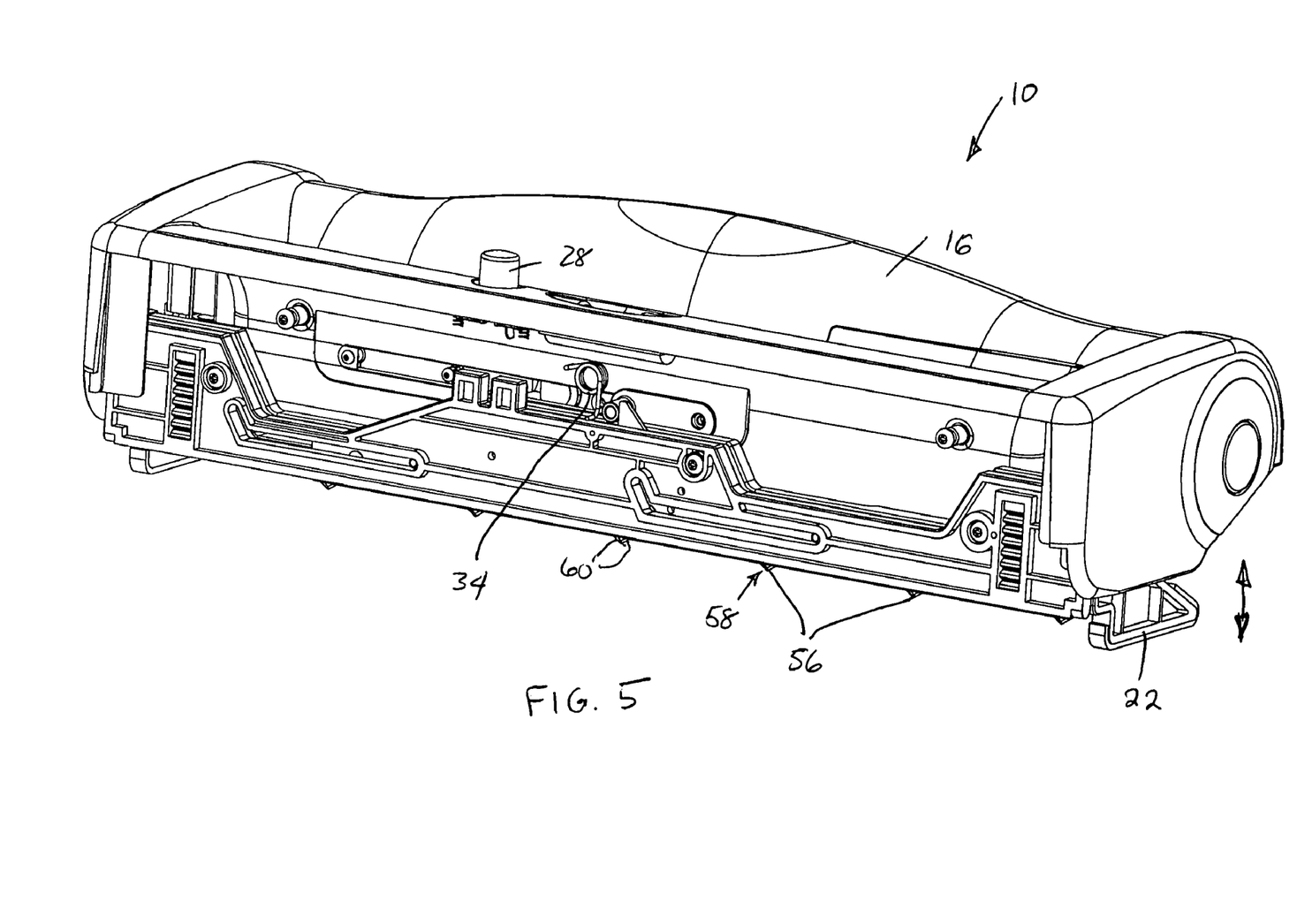
FIG. 5 is a perspective view similar to that shown in FIG. 4, only with the standoffs extended.

FIGS. 4 and 5 show that the applicator 10 comprises a spring-loaded mechanism or spring 34 for biasing the operating unit assembly 14 away from the remainder of the housing 12. In this embodiment, the user only needs to press the portion of the applicator with the extended standoffs 22 against the wall or other substrate. This causes the standoffs 22 to retract, and the sheet material 20 to come into contact with the substrate. It may be desirable for the applicator 10 to provide a slight resistive force when the standoffs 22 are pushed against the substrate to cause the same to retract. The spring 34 provides the applicator 10 with this property. The standoffs 22 will continue to retract so that they no longer engage the substrate, and in their retracted position have leading edges 22A that are disposed behind the surface of the burnishes 30 to avoid marring the substrate.

In the embodiment shown, the standoffs 22 can be deployed (or extended) after retraction in any suitable manner. For example, the standoffs 22 may be deployed by pressing the reset button 28. The standoffs 22 may also be deployed by operating the cutting mechanism 26. In the latter case, it is desirable for the standoffs 22 to be extended during the cutting operation so that the sheet material 20 is spaced away from the substrate during cutting to avoid cutting the substrate.

Figure 6:
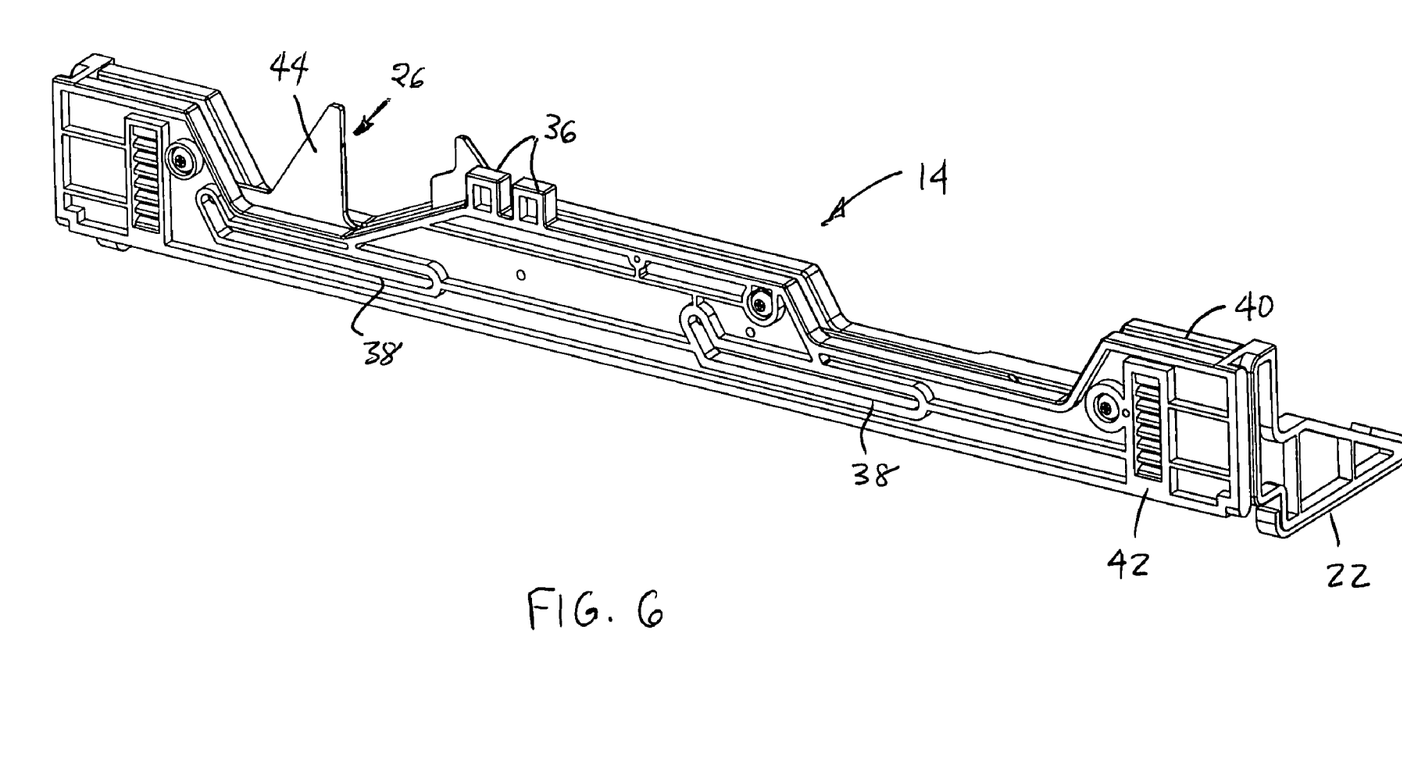
FIG. 6 is a perspective view of one non-limiting embodiment of a operating unit assembly.

FIG. 6 shows the operating unit assembly 14 removed from the applicator 10. As described above, the operating unit assembly 14 may comprise one or more of the following: the standoffs 22; a control bar 24; and a cutting mechanism 26. The cutting mechanism is designated generally by reference numeral 26; however, it may comprise several component parts. Also shown in FIG. 6 are protrusions 36 for contacting the reset button 28, and slots or tracks 38 for guiding the movement of the operating unit assembly 14.

Figure 7:
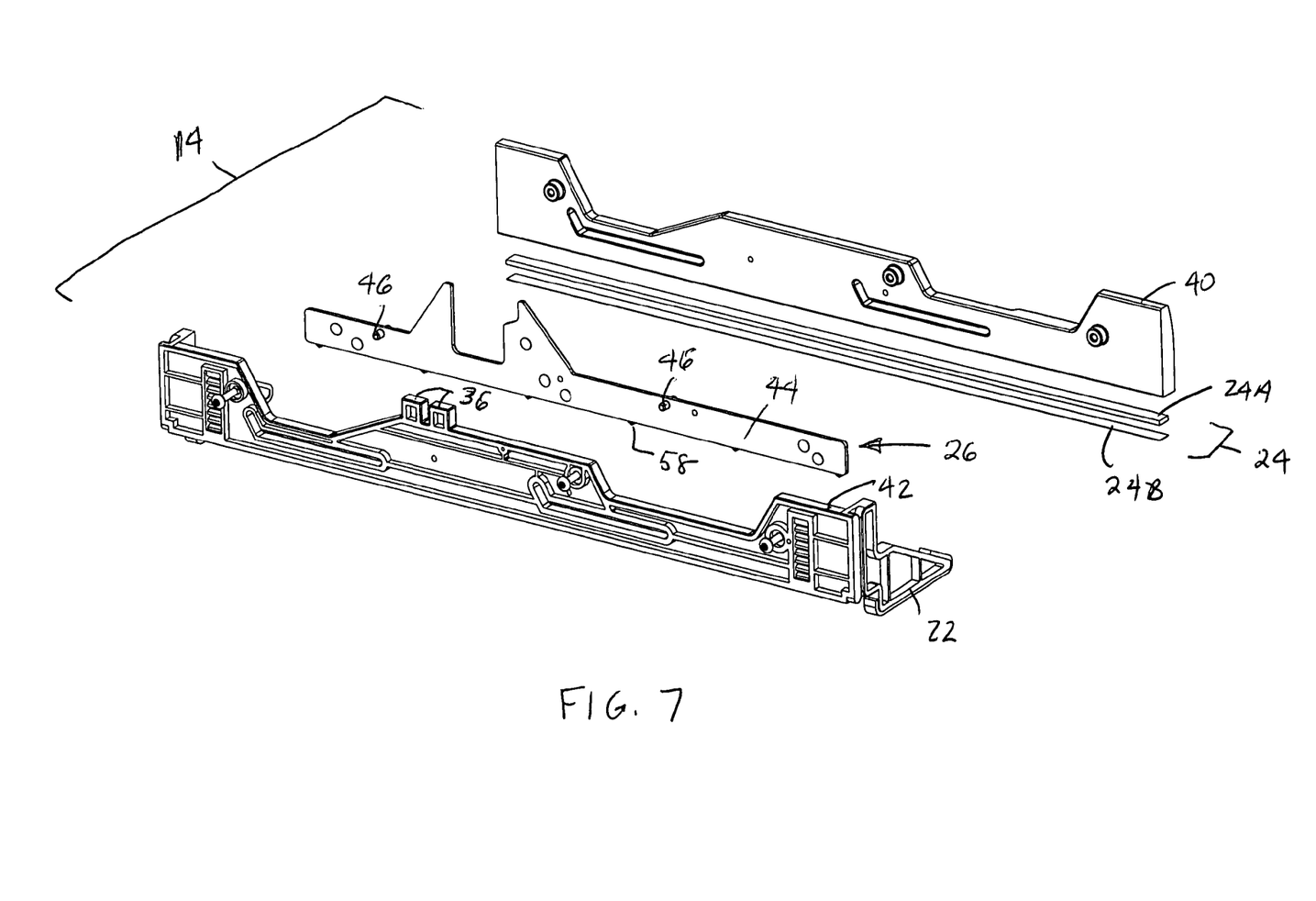
FIG. 7 is an exploded perspective view of the components comprising the operating unit assembly shown in FIG. 6.

FIG. 7 shows the individual components of one non-limiting embodiment of the operating unit assembly 14. In FIG. 7, these components include: a front plate 40 that attaches the operating unit assembly 14 to the housing 12 and/or frame 18, a back plate 42, a cutter bar 44, and the components of the control bar 24. The front plate 40 has two slotted portions therein that, together with matching slotted portions in the back plate 42, form the slots or tracks 38 for guiding the movement of the operating unit assembly 14. The cutter bar 44 has a pair of pins 46 that fit into the slots 38. The slotted portions in the front and back plates comprise a longitudinally-oriented portion to allow sliding movement of the cutter bar, and an upwardly angled portion at one end thereof to allow the cutter bar 44 to retract to a "safe" position.

The control bar 24 is preferably elongate, parallel to the longitudinal axis of the holder 16, and may be mounted on the frame 18. The control bar 24 engages and disengages the sheet material 20, and preferably the free end of the sheet material 20 or a portion of the sheet material 20 juxtaposed therewith. Preferably the control bar 24 has a length equal to or greater than the width of the substrate. The control bar 24 may have vacuum, adhesive, a coating which is cohesive with the sheet material 20 to be applied, hook and loop fasteners, or other coatings which are suitable for contacting, gripping or otherwise engaging the sheet material 20 to be applied. The coatings, vacuum, etc., may be durable or replaceable as desired. Further, the coatings or vacuum may be continuously or discontinuously applied across the length of the control bar 24 and hence across the width of the sheet material 20.

In the embodiment shown, the control bar 24 has an adhesive coating, providing for adhesive attachment of the control bar 24 to the sheet material 20. The components of the control bar 24, in this embodiment, comprise a double-sided adhesive tape 24A, and a control bar adhesive strip 24B joined thereto which may have properties that are tailored to adhere to certain types of releasable liner materials. In other embodiments, the control bar 24 may only comprise a single component. If an applicator geometry having generally perpendicularly oriented burnishes 30 is selected, as illustrated herein, care should be taken that the control bar 24 does not engage the sheet material 20 as it is applied to the substrate. To prevent this from occurring, a portion of the control bar 24 may be provided without adhesive, or removed therefrom. This may be accomplished by displacing the control bar 24 slightly towards the spool of material 20, as shown.

The engagement of the control bar 24 may be constant or variable across the width of the sheet material 20. For example, greater control of the sheet material 20 near the edges may be desired and, therefore, greater engagement may be necessary near the edges, near the center, or in one direction taken across the width, as desired. However, it is only necessary that the control bar 24 be engageable with and retractable from the sheet material 20, as desired.

Preferably, the control bar 24 and standoffs 22 are simultaneously engageable and disengageable from the sheet material 20 and the substrate, respectively, and more preferably that such engagement and disengagement occur in a single motion. However, one of skill will recognize that the control bar 24 and each or both standoffs 22 may be independently engaged and retracted.

In the embodiment shown, the applicator 10 may be further provided with a burnish 30. The burnish 30 may be disposed on the frame 18, the holder 16 or both. A burnish 30 is any surface or surfaces of the applicator 10 which provides for smoothing of the sheet material 20 when it is applied to the substrate, further presses the sheet material 20 and substrate together, and/or further ensures good engagement of the sheet material 20 and substrate without wrinkling, undue folds or misalignment due to stretching, etc. The surface may be flat or curvilinear and preferably convex.

The applicator 10 may have two or more separate burnishes 30 as illustrated in FIG. 2. The burnishes 30 may comprise a non-marring material so that force can be applied to the sheet material 20 during application without marring the same. For simplicity, only small portions of such material are shown in the drawings. It is understood that any suitable portion(s) of the surfaces, including the entire surfaces shown, can be provided with non-marring material.

In the embodiment shown in the drawings, the applicator 10 comprises two burnishes, a first burnish 30A which is flat, and a second burnish 30B. The burnishes 30 may be disposed 90° apart as shown, or may be disposed at any other convenient orientation. If more than one burnish 30 is provided, the burnishes 30 may comprise different surfaces. For example, a coarse burnish 30 may be used to assist with the initial application of the sheet material 20 to the substrate, a fine burnish 30 may be used to later assist in the application, etc. The burnishes 30 may be in any of the configurations, and have any of the properties of the burnishes described in U.S. patent application Ser. No. 10/700,614, filed on Nov. 4, 2003 (U.S. Patent Application Publication No. 2005/0092420 A1).

The second burnish 30B comprises a portion 48 that is flat. The second burnish 30B in the embodiment shown also has a marginal edge portion 50 that is disposed closest to the first burnish 30A along one longitudinal edge of the second burnish that has a generally convexly curved surface. The configuration of the second burnish 30B provides for a smooth transition when the user rotates the holder 16 while burnishing. This configuration also ensures that at least a portion of one of the burnishes 30 is behind the sheet material 20 when the sheet material 20 is in contact with the substrate so that the applicator 10 is able to burnish the entire time, including when the applicator 10 is being rotated. If desired, the different burnishes 30 may be provided with different colored surfaces for reference in providing instructions to a user of the applicator 10.

It has been found that there is an inverse relationship between the width of the sheet material 20 and the preferred length of the burnish 30, the length of the burnish 30 being taken in the direction of application of and parallel to the length of the sheet material 20. As the sheet material 20 becomes wider, the length of the burnish 30 in the direction of material 20 application should generally increase to provide adequate control for the sheet material 20. As the width of the sheet material 20 and/or length of the burnish 30 decrease, the user has greater control over the application of the sheet material 20 for steering and accommodating arcs or a curvilinear path as the sheet material 20 is applied.

For the embodiment described herein, a two-ply polymeric sheet material 20 having a removable PET carrier sheet having a width of approximately 29.5 cm, and a burnish 30 having a length of at least about 3.8 cm has been found suitable. The burnish 30 is provided with a stiff felt pile.

The applicator 10 may provide a generally cylindrical holder 16, which comprises a covering that serves as a handle that may be conveniently grasped by the user. The holder 16 is nested in the included angle formed between two separate burnishes 30. If the user applies the substrate to a vertical surface and starts at the top of the surface, as the applicator 10 approaches the bottom of the substrate, the user may conveniently roll the applicator 10 forward from the first burnish 30A to the second burnish 30B. This provides an ergonomically efficient design, allowing the user to maintain accurate positioning of the applicator 10 as it applies the material 20 to various heights of the substrate. The applicator 10 is also rolled forward when it is desired to cut the sheet material 20 so that the cutting mechanism 26 does not penetrate the substrate. If desired, the holder 16 may be provided with an overmolded, padded grip. The holder 16 may be provided with end caps 52 to hold a roll of sheet material 20 therein, and prevent the roll of sheet material 20 from shifting within the holder 16. In the embodiment shown, one of the end caps 52 is provided with quarter turn (approximately) locking mechanism.

If desired, the applicator 10 may further comprise a level 54. The level 54 may be disposed on the frame 18, the holder 16, or some other part of the applicator 10, as desired. The level 54 may be utilized to indicate horizontal orientation, vertical orientation, a 45° orientation, any intermediate orientation, or a combination thereof. A simple bubble level and/or laser level may be utilized, as is known to one of ordinary skill. The level 54 shown in FIG. 1 will be located above the roll of sheet material 20 when the applicator 10 is in the initial position.

As described above, the applicator 10 may further comprise a cutting mechanism 26, such as a blade, cutting wheel, hot wire, heated edge, etc. The cutting mechanism 26 may be mounted on the holder 16, frame 18, a combination thereof, or another component of the applicator 10.

While it is generally preferred that cutting occur parallel to the width of the sheet material 20, the direction of cut may be skewed relative to the width of the sheet material 20, and need not be straight. A jagged or curvilinear cut may occur, if desired.

In a preferred embodiment, the cutting mechanism 26 is mounted on the frame 18 and bilaterally traverses the track 38. The cutting mechanism 26 may be configured so that cutting may occur in: a single direction, or in either direction across the width of the material 20. If desired, the cutting mechanism 26 may retract from the direction of cutting of the sheet material 20 at one or both ends of the track 38. If desired, the cutting mechanism 26 may be biased so that it retracts automatically at either, or both, ends of the track 38. Biasing may be done by a spring, gravity influence, cam action, magnetic attraction, etc. In the embodiment shown, a coiled band spring is used to retract the cutting mechanism.

Certain sheet materials 20 may not sever easily when cutting by the cutting mechanism 26 is attempted. For example, thin polymeric materials 20 may have a tendency to bunch and wrinkle, rather than cleanly sever. This provides an uneven or unsightly appearance when the material 20 is applied to the substrate.

Referring to FIG. 5, to overcome this problem, the cutting mechanism 26 may be provided which, in sequence, punctures then severs the sheet material 20. This may be accomplished by providing a cutting mechanism 26 having two or more spaced apart prongs or discrete cutting points 56. The first prong is inserted into the sheet material 20 at a position inboard of the edge of the sheet material 20. The cutting mechanism 26 is moved laterally in the cutting direction and may be guided by a track 38. The second discrete cutting point 56 on the cutting mechanism 26 then cuts the remaining section which was uncut and further provides an additional point for severing any sheet material 20 left uncut by the first discrete cutting point 56.

In the embodiment shown in FIG. 5, a cutting mechanism comprising six cutting blades 58 is utilized. As shown in FIG. 5, the cutting blades 58 have exposed angled side edges 60 that meet at the cutting point 56. The cutting point 56 punctures the material 20, and the side edges 60 of the cutting blades sever the material 20 as the cutting mechanism 26 is moved transversely across the material 20. Providing the applicator with more than one spaced apart cutting blade may allow the sheet material 20 to be cut by a mechanism that does not have to traverse (e.g., slide across) the entire width of the sheet material 20. This can allow for more convenient operation in that the operator only need slide the cutting mechanism 26 a short distance.

The cutting mechanism 26 may be configured to create a slight overhang of any releasable liner or protective film associated with the sheet material 20 to facilitate the removal of the releasable liner from the sheet material 20 after the sheet material 20 is applied to the substrate. This can be done, for example, by orienting the planar surfaces of cutting blades 58 at an angle that is not exactly perpendicular to the portion of the sheet material 20 being cut.

The cutting mechanism shown in the drawings is provided with improved safety features. In this embodiment, the cutting mechanism 26 is configured so that the cutter bar 44 carrying the cutting blades 58 cannot be deployed unless both of the user's hands are on the barrel of the holder 16. The cutting mechanism 26 is provided with a safety mechanism, which, in the particular embodiment shown is a cutter release safety bar 62 (shown in FIG. 1). To operate the cutting mechanism 26, the user needs to squeeze the cutter release safety bar 62 with their left hand in order to slide the cutter actuator 64 that moves the cutter bar 44. The cutter actuator 64 is configured so that it will rest against the left side of the user's right index finger, and can be slid over to the left while the user's right hand remains on the barrel of the holder 16. When the user removes their hand from the safety mechanism 62, the cutter bar 44 carrying the cutting blades 58 will retract.

Since the user is able to keep both hands on the applicator 10 through the entire process, this provides a more stable method of applying the sheet material 20, and is not subject to problems of tilting the applicator as in cases where the user must move their hands to carry out one or more application steps.

In addition, as shown in FIG. 2, the cutting blades 58 are disposed within a recess 66 in the applicator 10. The recess 66 may be sufficiently narrow that a user will not be able to fit their fingers therein to contact the cutting blades 58. In one embodiment, the maximum width of the recess is 5 mm, and the cutting blades 58 are in a retracted position when not cutting that is at least 2-4 mm below the surface of the recess 66.

The need for a cutting mechanism 26 can be obviated by providing sheet material 20 with discrete lines of weakness (not shown) spaced apart along the length of the sheet material 20. This arrangement may be advantageous when the sheet material 20 is intended to be used for pre-sized applications, such as occurs when the sheet material 20 contains advertisement, decorative effects sized to cover light switches, etc. The lines of weakness may be provided by perforations, thin sections within the material 20, etc., as are known in the art One of skill will recognize that the sheet material 20 may be adhesively coated on the side which contacts the substrate. This provides for convenient application of the sheet material 20 to the substrate. Alternatively, the adhesive may be activated by water during application to the substrate, or may even be applied to the face of the sheet material 20 during application, as are known in the art. In yet another embodiment, the sheet material 20 may have a carrier strip disposed on one side, as is known in the art. The carrier strip is removed upon application of the sheet material 20 to the substrate. If desired, the applicator 10 may further comprise a take-up roll for convenient spooling of the carrier strip as it is removed from the sheet material 20. The take-up roll may be biased to maintain tension of the carrier strip as it is wound thereon.

If an embodiment utilizing a carrier film and sheet material 20 is selected, preferably the applicator 10 provides for extended contact of the sheet material 20 and carrier film upon application to the substrate. Contrary to the knife edge attempts in the art described above, Applicants have found that extended contact in the direction of application of the sheet material 20 and carrier film prior to separation of the carrier film from the sheet material 20, improves the tracking and positioning of the sheet material 20 on the substrate. A coextensive distance of at least 2.5 cm, and more preferably at least 3.8 cm, as taken in the application direction, has been found to work well for application of the carrier strip and sheet material 20 to the substrate.

While the relative motion of the operating unit assembly 14 of the applicator 10 has been described above as translation enabled by sliding of the operating unit assembly 14 relative to the remainder of the housing 12, the invention is not so limited. Relative motion between the operating unit assembly 14 and the remainder of the housing 12 may also be accomplished by pivoting either or both of the operating unit assembly 14 and the remainder of the housing 12.

In operation, the sheet material 20 is inserted into the holder 16. The sheet material 20 may comprise a spool which is spiral wound, discrete or endwise connected flat sheets, or any other desired configuration. The applicator 10 is placed into the first position as described above. The applicator 10 is placed against the substrate, so that one or more of the standoffs 22 engage the substrate and are in contact therewith. The sheet material 20 is spaced apart from the substrate. The applicator 10 is then adjusted for the position and desired location of the sheet material 20 (such as with level 54). By having the sheet material 20 spaced apart from the substrate, easy adjustment can occur, even when the sheet material 20 is provided with an adhesive coating for the convenience of the user. In the first position, the control bar 24 engages the sheet material 20, preferably at a position juxtaposed with its free end. Of course, one will recognize that the applicator 10 need not have both a control bar 24 and standoffs 22. Providing either will enable the user to conveniently adjust the position of the sheet material 20 on the substrate without prematurely contacting the sheet material 20 to the substrate.

The operating unit assembly 14 is moved from the first position to the second position by pressing the applicator with the extended standoffs 22 against the substrate. In the second position, the standoffs 22 are retracted or otherwise disengaged from the substrate. The sheet material 20 then contacts or otherwise engages the substrate. Alternatively or additionally, upon moving the operating unit assembly 14 from the first position to the second position, the control bar 24 is retracted from or otherwise disengages the sheet material 20. This also allows the sheet material 20 to be engaged with the substrate. A quantity of the sheet material 20 is then applied to the substrate. The quantity may be determinate, such as occurs when a predetermined length is dispensed, or the quantity of sheet material 20 may be indeterminate, such as may occur when a quantity of the sheet material 20 is applied to the substrate along a wall and cut at a desired point. The desired point may occur at a midpoint on the wall, when a baseboard is reached, etc.

If the sheet material 20 does not have lines of weakness or a determinate length, the sheet material 20 is cut so that a quantity remains in the holder 16 and the portion of the sheet material 20 applied to the substrate is separable from the applicator 10. In a preferred operation, to cut the sheet material 20, the applicator 10 is rotated forward (such as at the bottom of a wall), and the operating unit assembly 14 may be returned from the second position to the first position. This pulls the sheet material 20 away from the substrate, thereby tensioning the sheet material 20 for convenient cutting by the cutting mechanism 26. Additionally or alternatively, the control bar 24 engages the portion of the sheet material 20 which becomes the free end upon cutting. The operation may then be repeated as desired.

The operation and applicator 10 described and claimed herein provide the advantage that control of the sheet material 20 may be maintained at all times. The sheet material 20 is either engaged by the control bar 24, while it is not being applied or, alternatively, is engaged by the substrate when the sheet material 20 is applied. Upon termination of application to the substrate, the control bar 24 again reengages the sheet material 20. Separately, the applicator 10 may engage either the sheet material 20, or the substrate, or both. This arrangement allows the applicator 10 to not only control the sheet material 20 through the control bar 24, control the spacing of the sheet material 20 from the substrate, through the standoffs 22, but also allows for disengagement of either or both independently or together, as desired.

The applicator 10 may be provided with numerous other features or properties. For example, there may be one or more operating unit assemblies. It should be understood that if the applicator 10 has more than one operating unit assembly, not all of such operating unit assemblies need be movable relative to the remainder of the housing 12. In addition, in some embodiments, it may be desirable for the applicator 10 to be provided with markings or indicia 68 to provide the user with guidelines for aligning the applicator 10 to properly overlap adjacent sheets of the sheet material 20 during application of the sheet material 20 to the substrate. In addition, in any of the embodiments described herein, it may be desirable for the frame 18 and/or the holder 16 to be made of transparent or translucent material so that the user can see the operation of the same.

If desired, the applicator 10 and sheet material 20 may be supplied as a kit. The kit may include one or more applicators 10, and one or more quantities of sheet material 20 usable with the applicator 10. This arrangement provides the advantage that the user has the applicator 10 for extended and multiple uses, and can replenish the sheet material 20 as needed. The sheet material 20 can be replenished when it is exhausted, or when different colors, sizes, thicknesses, protective qualities, or other properties of the sheet material 20 are desired. Each different type or sheet material 20 can be used with a single applicator 10. The applicators 10 may be differently sized, to handle greater or lesser quantities of the same sheet material 20, may be proportioned accommodate sheet materials 20 of greater thicknesses, stiffnesses, etc.

If desired, the kit may further include a device for separating the sheet material 20 and carrier film. One suitable device which is found to work well is a device comprising a handle and rotatable roller, resembling a paint roller. The roller is provided with adhesive on the circumference. Using the handle, the user rolls the roller of the device across an edge of the sheet material 20 after it has been applied to the substrate. The adhesive of the roller picks up the edge, and preferably the corner, of the carrier film allowing it to be easily grasped by the user for complete removal from the sheet material 20.

All documents cited in the Detail Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A bi-positionable applicator for applying a sheet material to a substrate, said applicator comprising:
   a housing comprising a holder for receiving a quantity of sheet material therein, wherein at least a portion of said housing comprises a handle for gripping by a user;
   an operating unit assembly movably joined to said housing, at least a portion of said operating unit assembly being movable relative to said housing from a first position to a second position, wherein at least a portion of said operating unit assembly engages at least one of the sheet material and the substrate in said first position and disengages the sheet material or substrate in said second position; and a cutting mechanism comprising part of said operating unit assembly, said cutting mechanism comprising:

at least one cutting blade disposed in a recess in said housing when said cutting blade is not in use;

a cutter actuator for activating said at least one cutting blade so that said cutting blade is disposed at least partially outside said recess, said cutter actuator being at least indirectly joined to said at least one cutting blade, wherein said cutter actuator is located in a recess between said housing and a frame so that it will rest against the side of one of the user's fingers while the user's hand remains on the handle.

2. The bi-positionable applicator of claim 1 wherein said cutting mechanism further comprises a safety mechanism operatively joined to the portion of said housing comprising a handle for gripping by a user, said safety mechanism being joined at least indirectly to said at least one of said cutting blade and said cutting actuator, said safety mechanism having a first position and a second position, wherein said safety mechanism permits the cutter actuator to move when said safety mechanism is in its second position, but not in its first position, wherein said safety mechanism comprises a cutter release safety bar on said handle.

3. A method for applying a sheet material to a substrate, said sheet material having a width, said method comprising the steps of:

providing a bi-positionable applicator, said applicator comprising a housing comprising a holder for receiving a quantity of sheet material therein, wherein at least a portion of said housing comprises a handle for gripping by a user;

an operating unit assembly movably joined to said housing, wherein at least a portion of said operating unit assembly is biased to move away from said housing by a spring, and is movable relative to said housing from a first position to a second position, wherein at least a portion of said applicator engages said sheet material and the substrate in said first position;

placing said applicator against the substrate, whereby said sheet material is spaced apart from said substrate;

moving said operating unit assembly from said first position to said second position by pressing said applicator against said substrate so that at least a portion of said operating unit assembly retracts and said sheet material contacts said substrate and said applicator is in a first orientation;

moving said applicator in an application direction, whereby said sheet material is applied to the substrate;

rotating said applicator to a second orientation wherein at least a portion of said applicator engages said sheet material; and cutting said sheet material with a cutting mechanism comprising part of said operating unit assembly, said cutting mechanism comprising:

at least one cutting blade disposed in a recess in said housing when said cutting blade is not in use;

a cutter actuator for activating said at least one cutting blade so that said cutting blade is disposed at least partially outside said recess, said cutter actuator being at least indirectly joined to said at least one cutting blade, wherein said cutter actuator is located in a recess between said housing and a frame so that it will rest against the side of one of the user's fingers while the user's hand remains on the handle.

4. A bi-positionable applicator for applying a sheet material to a substrate, said applicator comprising:

a housing comprising a holder for receiving a quantity of sheet material therein, wherein at least a portion of said housing comprises a handle for gripping by a user;

an operating unit assembly movably joined to said housing, wherein at least a portion of said operating unit assembly is movable relative to said housing from a first position to a second position, wherein at least a portion of said applicator engages at least one of the sheet material and the substrate in said first position and disengages the sheet material or substrate in said second position, wherein said operating unit assembly comprises:

at least one standoff for spacing a sheet material away from the substrate, said at least one standoff joined to a portion of said operating unit assembly and being disposable against the substrate to which the sheet material is to be applied to engage the substrate when said operating unit assembly is in said first position, said standoff being retractable from said substrate when said operating unit assembly is moved to said second position;

an elongate control bar joined to a portion of said operating unit assembly, said elongate control bar for attaching the free end of the sheet material thereto when said operating unit assembly and said holder are in said first position, said free end of said sheet material being released from said control bar when said frame and said holder are in said second position; and a cutting mechanism joined to a portion of said operating unit assembly, said cutting mechanism comprising at least one cutting blade disposed in a recess in said housing when said cutting blade is not in use, wherein the at least one standoff, control bar, and cutting mechanism can be deployed by moving only one portion of the applicator only operating the cutting mechanism.

* * * * *

UNITED STATES PATENT AND TRADEMARK OFFICE
CERTIFICATE OF CORRECTION

PATENT NO. : 7,540,933 B2
APPLICATION NO. : 11/413765
DATED : June 2, 2009
INVENTOR(S) : Michael Bernard Dugas et al.

It is certified that error appears in the above-identified patent and that said Letters Patent is hereby corrected as shown below:

Column 1

Line 51, delete "comer" and insert -- corner --.

Column 14, Claim 4

Lines 35-36, delete "moving only one portion of the applicator".

Signed and Sealed this

Thirtieth Day of March, 2010

David J. Kappos
*Director of the United States Patent and Trademark Office*